United States Patent
Yamaguchi et al.

(10) Patent No.: US 9,397,535 B2
(45) Date of Patent: Jul. 19, 2016

(54) BRUSHLESS MOTOR AND ELECTRIC-POWERED TOOL

(71) Applicant: HITACHI KOKI CO., LTD., Tokyo (JP)

(72) Inventors: Hayato Yamaguchi, Ibaraki (JP); Hideyuki Tanimoto, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 423 days.

(21) Appl. No.: 13/958,838

(22) Filed: Aug. 5, 2013

(65) Prior Publication Data

US 2014/0084717 A1 Mar. 27, 2014

(30) Foreign Application Priority Data

Sep. 26, 2012 (JP) ................................ 2012-212959

(51) Int. Cl.
- *H02K 7/14* (2006.01)
- *H02K 9/06* (2006.01)
- *H02K 1/27* (2006.01)

(52) U.S. Cl.
CPC .................. *H02K 9/06* (2013.01); *H02K 7/145* (2013.01); *H02K 1/276* (2013.01)

(58) Field of Classification Search
CPC ......... H02K 7/145; H02K 9/06; H02K 1/276; B25F 5/02
USPC ...................... 310/50, 62, 63, 156.53, 156.56
See application file for complete search history.

(56) References Cited

U.S. PATENT DOCUMENTS

| | | | | |
|---|---|---|---|---|
| 2010/0283332 | A1* | 11/2010 | Toukairin | B25F 5/008 310/50 |
| 2011/0227430 | A1* | 9/2011 | Omori | B25F 5/00 310/50 |
| 2011/0273037 | A1* | 11/2011 | Ota | H02K 1/2733 310/50 |
| 2012/0080963 | A1* | 4/2012 | Yoshikawa | B25F 5/02 310/50 |
| 2012/0319508 | A1* | 12/2012 | Oomori | B25F 5/02 310/50 |
| 2012/0319509 | A1* | 12/2012 | Kishima | B23B 45/02 310/50 |

FOREIGN PATENT DOCUMENTS

| | | |
|---|---|---|
| JP | 5-103443 A | 4/1993 |
| JP | 2005-269831 A | 9/2005 |
| JP | 2009-72889 A | 4/2009 |
| JP | 2010-99823 A | 5/2010 |

OTHER PUBLICATIONS

Japanese Office Action for the related Japanese Patent Application No. 2012-212959 dated Jan. 6, 2016.

* cited by examiner

*Primary Examiner* — Thanh Lam
(74) *Attorney, Agent, or Firm* — Kenealy Vaidya LLP

(57) ABSTRACT

In a brushless motor, a rotor core is fixed to a shaft. Through holes are formed in the rotor core, and permanent magnets are inserted to be fixed in place in the through holes. A stator core is fixed to an outer circumferential surface of the rotor core such that the stator core faces the outer circumferential surface of the rotor core. Stator coils are provided on the stator core via insulators so as to configure magnetic flux generating portions. A cooling fan is provided in front of a stator which is configured by the stator core and the stator coils. Axial position of blades of the fan and axial positions of the rotor core and the permanent magnets partially overlap each other in their positions.

6 Claims, 4 Drawing Sheets

COMPARATIVE EXAMPLE

BRUSHLESS MOTOR AND ELECTRIC-POWERED TOOL

CROSS-REFERENCE TO RELATED APPLICATIONS

This application claims priority from Japanese Patent Application No. 2012-212959 filed on Sep. 26, 2012, the entire subject-matter of which is incorporated herein by reference.

TECHNICAL FIELD

The present invention relates to a brushless motor having a fan and an electric-powered tool using the motor.

BACKGROUND

A brushless motor is used as a drive source in an electric-powered tool such as an impact driver. To meet the demands for small and high-output brushless motors, neodymium magnets are used in many cases as magnets for rotors. Additionally, a cooling fan is attached to a shaft of such a brushless motor. For example, see JP-A-2009-72889 and JP-A-2010-99823.

SUMMARY

In recent years, the price of neodymium magnet is soaring, which interrupts the attempt to produce low-cost electric powered tools. When other low-price magnets are used in place of neodymium magnets, although the production costs are reduced, a surface area of a magnet needs to be increased to obtain an equal amount of magnetic flux to that provided by a neodymium magnet. Thus, in case where related-art configurations are adopted, a size of a product becomes large.

Therefore, illustrative aspects of to the invention provide a brushless motor which can increase the surface area of a magnet when compared with the related-art brushless motor without increasing the size of a product and an electric-powered tool using the brushless motor.

According to one illustrative aspect of the invention, there is provided a brushless motor comprising: a shaft; a rotor provided on an outer circumference of the shaft; a stator having a magnetic flux generating portion which faces an outer circumferential surface of the rotor; and a fan configured to rotate together with the shaft at one end in an axial direction of the stator, wherein an axial position of a blade of the fan and an axial position of a permanent magnet of the rotor are close to or partially overlap each other.

According to another illustrative aspect of the invention, there is provided an electric-powered tool having the brushless motor according to the above illustrative aspect as a drive source.

Incidentally, arbitrary combinations of the aforesaid constituent elements and changes in representation of the invention with respect to method and system are also effective as exemplary embodiments of the invention.

According to the illustrative aspects of the invention, it becomes possible to increase the surface area of the magnet when compared with the related-art brushless motor without increasing the size of a product.

DETAILED DESCRIPTION

Figure 1:
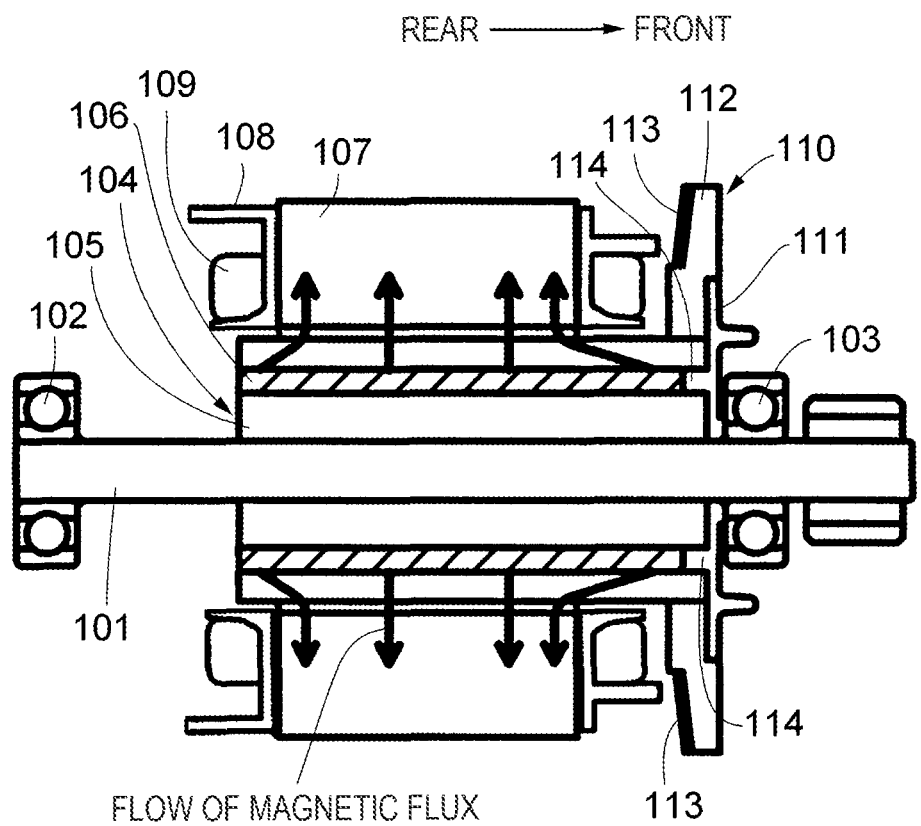
FIG. 1 is a side sectional view of a brushless motor according to an exemplary embodiment of the invention.

Hereinafter, exemplary embodiments of the invention will be described with reference to the drawings. Incidentally, reference numerals will be given to the same or like constituent elements or members so as to omit the repetition of similar descriptions as appropriate. Additionally, the exemplary embodiment is an example of the invention and is not intended to limit the invention, and hence, all the characteristics that are described in the exemplary embodiment or combinations thereof are not always essential to the invention.

Figure 2:
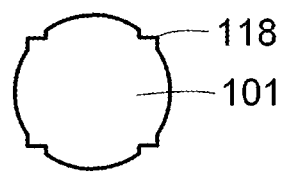
FIG. 2 is an enlarged front view of a shaft of the brushless motor.
Figure 3:
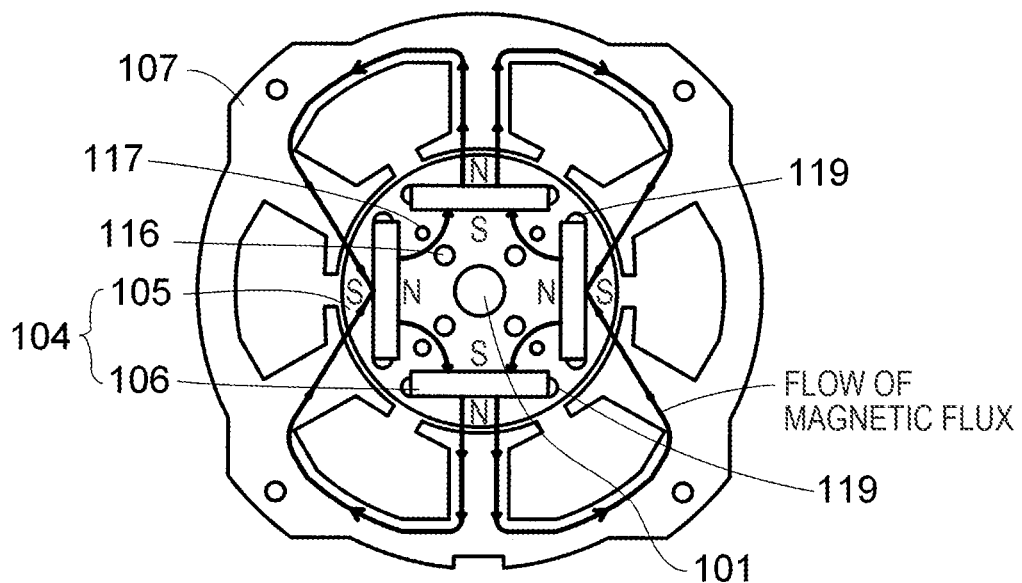
FIG. 3 is a front view of the brushless motor with a fan omitted (a view as seen from the front)
Figure 4:
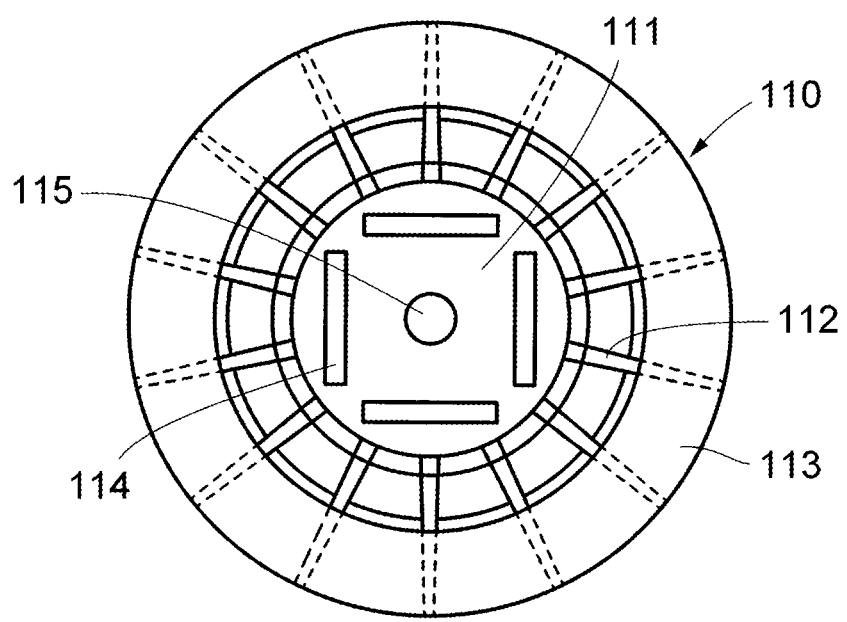
FIG. 4 is a rear view of the fan of the brushless motor (a view as seen from the rear)
Figure 5:
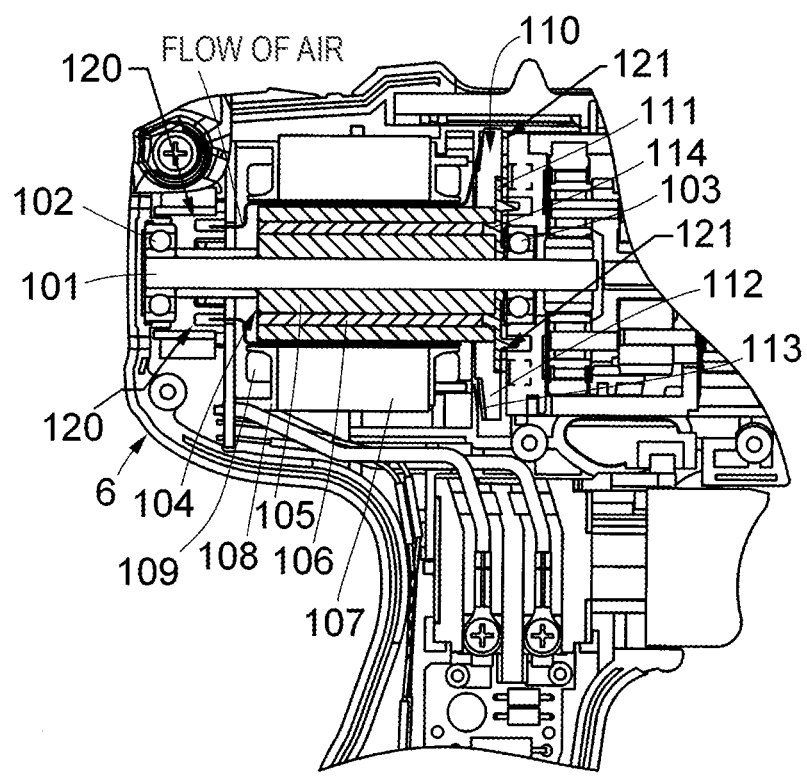
FIG. 5 is an enlarged side view of part of an electric-powered tool in which the brushless motor is incorporated.

FIG. 1 is a side sectional view of a brushless motor 100 according to an exemplary embodiment of the invention. FIG. 2 is an enlarged front view of a shaft 101 of the brushless motor 100. FIG. 3 is a front view of the brushless motor 100 with a fan 110 omitted (a view as seen from the front). In FIG. 3, the illustration of stator coils 109 is omitted. FIG. 4 is a rear view of the fan 110 of the brushless motor 100 (a view as seen from the rear). FIG. 5 is an enlarged side view of part of an electric-powered tool in which the brushless motor 100 is incorporated.

In a brushless motor 100, a shaft 101 is supported rotatably by bearings 102, 103 which are fixed to a main body housing 6 (FIG. 5). A rotor core 105 having a substantially cylindrical shape and made of a magnetic material is fixed to the shaft 101. Additionally, as shown in FIG. 2, stakings 118 (concavo-convex portions of a projection and a depression which extend in an axial direction) are formed in four locations on an outer circumferential surface of the shaft 101, and the shaft 101 is press fitted in a central through hole in the rotor core 105, whereby the rotor core 105 is fixed to the shaft 101. Incidentally, an adhesive may be used additionally to fix the rotor core 105 to the shaft 101.

As shown in FIG. 3, four through holes 119 are formed in the rotor core 105 around a central axis thereof. A permanent magnet 106 is inserted in each of the through holes 119 to be fixed in place therein. The rotor core 105 and the permanent magnets 106 configure a rotor 104. Further, four air holes 116 and four crimping holes 117 are formed in the rotor core 105. A stator core 107 is fixed to the housing 6 (FIG. 5) so as to face an outer circumferential surface of the rotor core 105. As shown in FIG. 1, stator coils 109 are provided on (wound around) the stator core 107 via insulators 108 (insulating members) so as to configure magnetic flux generating portions. A cooling fan 110 (made of resin, for example) is provided in front of a stator which is configured by the stator core 107 and the stator coils 109.

As shown in FIG. 4, in the fan 110, projecting portions 114 are formed in four locations around a center hole 115 (a shaft insertion hole) at an inner base portion 111. The projecting portions 114 fit individually in the corresponding through holes 119 in the rotor core 105 to configure a lock. Blades 112 of the fan 110 rise from the inner base portion 111 to the rear (in other words, blades 112 have a thickness from the inner base portion 111 toward the rear) and extend outwards from the inner base portion 111. Outer circumferential rear end portions of the blades 112 are connected to each other by an outer base portion 113. As shown in FIG. 5, air is sucked in from an air induction port 120 in a rear side surface of the housing 6, passes between the rotor core 105 and the stator core 107 and is discharged from air discharge ports 121 in a side surface of an intermediate portion of the housing 6.

As shown in FIG. 1, axial positions of the blades 112 of the fan 110 in an axial direction of the shaft and axial positions of the rotor core 105 and the permanent magnets 106 in the axial direction of the shaft partially overlap each other. Additionally, inner edges of the blades 112 are close to or in contact with an outer circumferential surface of the rotor core 105. According to this configuration, when compared with a configuration (for example, refer to a comparison example shown in FIG. 6, which will be described later) in which axial positions of the blades 112 are apart from axial positions of a rotor core 105 and permanent magnets 106, the rotor core 105 and the permanent magnets 106 are extended so as to bite into the fan 110, and therefore, the surface areas of the magnets can be increased without increasing the size of a product. Consequently, even in the event that samarium-cobalt magnets, which are inexpensive compared with neodymium ones, are used in place of expensive neodymium magnets, an amount of magnetic flux can be obtained which is equal to the amount of magnetic flux that can be obtained by the neodymium magnets. Also, when the axial positions of the blades 112 of the fan 110 and the axial positions of the rotor core 105 and the permanent magnets 106 are close to or in contact with each other, the effect of increased surface areas of the magnets can be obtained, although not as much as obtained when they overlap each other.

Figure 6:
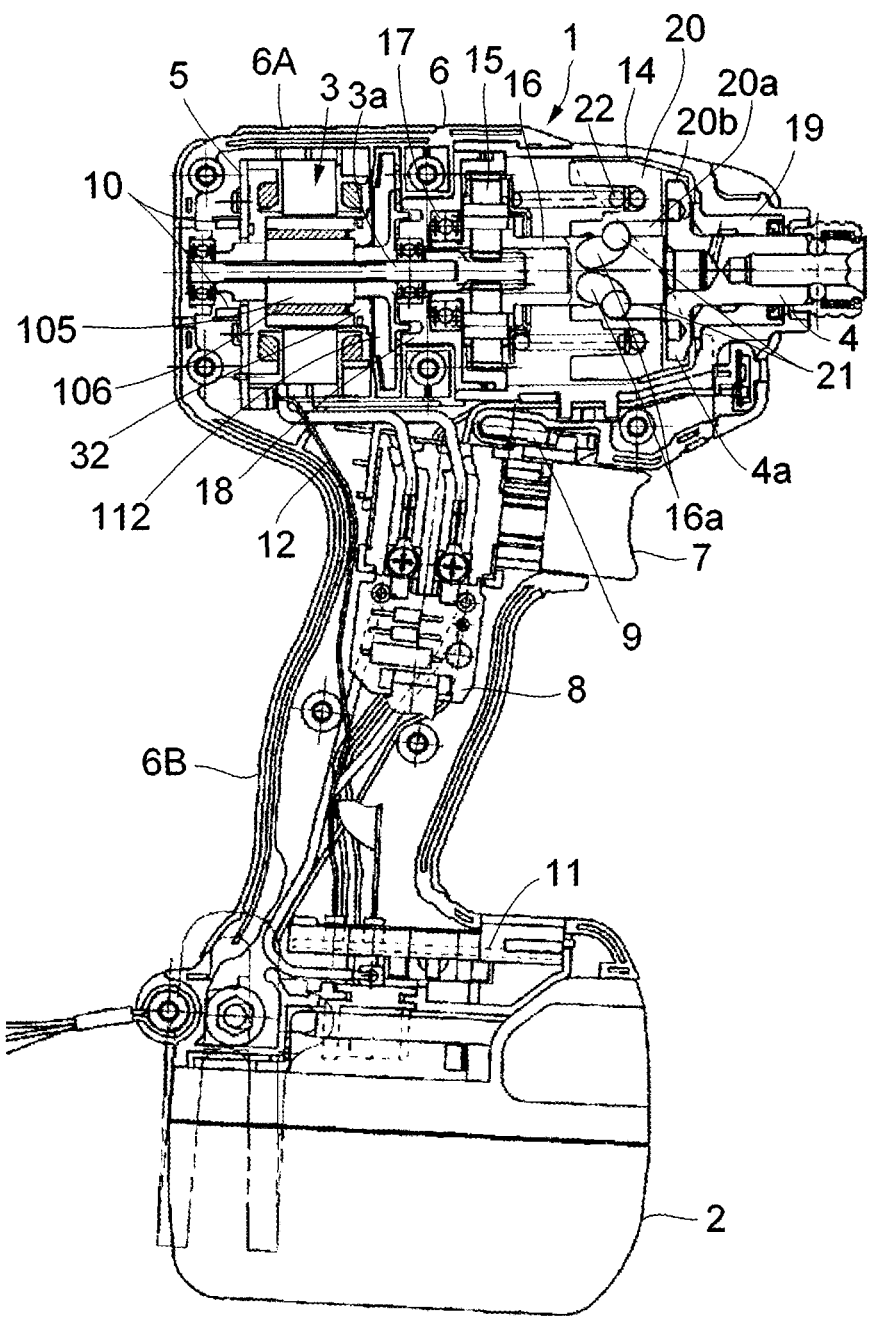
FIG. 6 is a side sectional view showing an overall configuration of an impact driver according to a comparison example

FIG. 6 is a side sectional view showing an overall configuration of an impact driver 1 according to the comparison example. In this impact driver 1, a battery 2 is used as a power supply, and a brushless motor 3 is used as a drive source. Then, a rotating and hammering mechanism is driven by the brushless motor 3 to rotate and hammer an anvil 4 so as to intermittently transmit a rotational hammering force to a tip tool (not shown) such as a driver bit to thereby perform screw tightening work, for example. This brushless motor 3 has the same configuration as that of the brushless motor 100 of the exemplary embodiment excluding a configuration in which a sleeve 32 is interposed between the blades 112 of the fan and the rotor core 105, whereby the axial positions of the blades 112 are apart from the axial positions of the rotor core 105 and the permanent magnet 106.

The brushless motor 3 and an inverter circuit board 5 which drives and controls the brushless motor 3 are accommodated within a body portion 6A of a housing 6. A trigger switch 7, a switch circuit board and a forward and backward rotation switching lever 9 are provided in an upper portion of a handle portion 6B which extends downwards integrally from the body portion 6A of the housing 6. The trigger switch 7 and the switch circuit board 8 are configured to switch on and off the feeding of the brushless motor 3 from the battery 2 to start and stop the brushless motor 3. The forward and backward rotation switching lever 9 is configured to switch rotations of the brushless motor 3 between forward and backward rotations. Additionally, output transistors (FETs) 10 are provided on the inverter circuit board 5.

A control circuit board 11 is accommodated in a lower portion (a battery attaching portion) of the handle portion 6B of the housing 6. The control circuit board 11 and the inverter circuit board 5 are electrically connected via a flat cable 12 which extends from the control circuit board 11.

In the rotating and hammering mechanism incorporated in a hammer case 14, the rotation of an output shaft 3a of the brushless motor 3 is transmitted to a spindle 16 by way of a planetary gear mechanism 15 while the rotational speed of the output shaft 3a is reduced, whereby the spindle 16 is driven to rotate at a predetermined speed. An axial end (a rear end) of the spindle 16 is supported rotatably on a gear cover 18 via a bearing 17, and the other end (a front end) thereof is held rotatably in a central portion of the anvil 4. The anvil 4 is supported rotatably at a front end portion of the hammer case 14 via a bearing metal 19. A hammer 20 is supported rotatably on an outer circumference of the spindle 16, and the spindle 16 and the hammer 20 are connected together by a cam mechanism. Here, the cam mechanism is configured by a V-shaped spindle cam groove 16a formed on an outer circumferential surface of the spindle 16, a V-shaped hammer cam groove 20a formed on an inner circumferential surface of the hammer 20 and balls 21 which are in engagement with these cam grooves 16a, 20a. Additionally, the hammer 20 is always biased in the direction of a distal end (rightwards in FIG. 6) by a spring 22, and when it is in a stationary state, the hammer 20 is positioned apart from an end face of the anvil 4 by an engagement of the balls 21 with the cam grooves 16a, 20a. Projecting portions 20b, 4a are formed symmetrically in two locations on facing rotational planes of the hammer 20 and the anvil 4, respectively.

When the trigger switch 7 is on, the switch circuit board 8 is activated, and the brushless motor 3 is fed from the battery 2, whereby the brushless motor 3 is actuated, while the inverter circuit board 5 is activated by a control signal from the control circuit board 11, whereby the brushless motor 3 is controlled. Then, the rotation of the brushless motor 3 is transmitted to the spindle 16 while the speed of the rotation is reduced by the planetary gear mechanism 15, whereby the spindle 16 is driven to rotate. When the spindle 16 is driven to rotate, the rotation thereof is transmitted to the hammer 20 via the cam mechanism. Then, the projecting portions 20b of the hammer 20 are brought into engagement with the corresponding projecting portions 4a of the anvil 4 so as to rotate the anvil 4 before the hammer 20 rotates half a full rotation. When a relative rotation is produced between the spindle 16 and the hammer 20 by an engagement reaction force produced at the time of engagement of the projecting portions 20b of the hammer 20 with the projecting portions 4a of the anvil 4, the hammer 20 starts retreating towards the brushless motor 3 along the spindle cam groove 16a of the cam mechanism while compressing the spring 22. Then, when the projecting portions 20b of the hammer 20 ride over the corresponding projecting portions 4a of the anvil 4 to thereby release the engagement therebetween as a result of the retreating motion of the hammer 20, the hammer 20 is moved to the front by means of the biasing force of the spring 22 while being accelerated quickly in the rotational direction and to the front by the elastic energy accumulated in the spring 22 and the action of the cam mechanism, in addition to the rotational force of the spindle 16. Then, the projecting portions 20b of the hammer 20 are brought into engagement with the projecting portions 4a of the anvil 4 again to thereby start rotating together with the anvil 4. As this occurs, a strong rotational hammering force is applied to the anvil 4, so that the rotational hammering force is transmitted to a screw (not shown) via the tip tool (not shown) which is attached to the anvil 4. Thereafter, the same action is repeated, whereby the rotational hammering force is intermittently and repeatedly transmitted to the screw from the tip tool, so that the screw is screwed into a material to be fastened such as wood.

Thus, while the invention has been described based on the exemplary embodiment, those skilled in the art can understand that various modifications can be made to the constituent elements and the treatment processes which are described in the exemplary embodiment without departing from the spirit and scope described in the claims. A modified example will be described below.

A rotor 104 may be a cylindrical magnet which is fixed to a shaft 101 in place of the combination of the rotor core 105 and the permanent magnets 106. In this case, notches or depressed portions are provided in an end portion of the cylindrical magnet so as to fit on the projecting portions 114 of the fan 110 to thereby configure a lock for preventing a relative rotation therebetween.

What is claimed is:

1. A brushless motor comprising:

a shaft; a rotor provided on an outer circumference of the shaft;

a stator having a magnetic flux generating portion which faces an outer circumferential surface of the rotor; and a fan configured to rotate together with the shaft at one end in an axial direction of the stator, wherein an axial position of a blade of the fan and an axial position of a permanent magnet of the rotor partially overlap each other.

2. The brushless motor according to claim 1, wherein:

the rotor has a magnetic core having a substantially cylindrical shape and comprising a plurality of holes individually opened to at least one end face thereof;

permanent magnets are held individually in the holes; and the fan has projecting portions which fit in the holes.

3. The brushless motor according to claim 1, wherein:

the rotor has a magnetic core having a substantially cylindrical shape; and the axial position of the blade of the fan and an axial position of the magnetic core of the rotor partially overlap each other.

4. The brushless motor according to claim 1, wherein:

the rotor has a magnetic core having a substantially cylindrical shape and comprising a plurality of holes individually opened to at least one end face thereof;

the fan comprises an inner base portion; the blade has a thickness from the inner base portion toward one side in an axial direction of the shaft and extends outwards from the inner base portion; and the inner base portion has the projecting portions which protrude toward the one side in the axial direction to fit in the respective holes of the magnetic core.

5. The brushless motor according to claim 4, wherein the axial position of the blade and axial positions of the projecting portions are partially overlap each other.

6. An electric-powered tool having the brushless motor according to claim 1 as a drive source.

* * * * *